Nov. 24, 1953 — R. E. FOGG — 2,660,148
ADHESIVE EXTRUDER FOR BOOKBINDING MACHINES
Filed July 28, 1951 — 7 Sheets-Sheet 6

INVENTOR
ROBERT E. FOGG
BY
ATTORNEYS

Nov. 24, 1953            R. E. FOGG            2,660,148
ADHESIVE EXTRUDER FOR BOOKBINDING MACHINES
Filed July 28, 1951            7 Sheets-Sheet 7

INVENTOR
ROBERT E. FOGG
BY
Marechal & Biebel
ATTORNEYS

Patented Nov. 24, 1953

2,660,148

UNITED STATES PATENT OFFICE 2,660,148

ADHESIVE EXTRUDER FOR BOOKBINDING MACHINES

Robert E. Fogg, Dayton, Ohio, assignor to McCall Corporation, Dayton, Ohio, a corporation of Delaware Application July 28, 1951, Serial No. 239,093

21 Claims. (Cl. 118—2)

This invention relates to apparatus for binding magazines, books and the like, and more particularly to apparatus for applying adhesive to the backs of successive magazines or books in a book binding machine.

A book binding operation of this character is commonly performed on a machine which includes a suitable conveyor for carrying a series of successive books through successive work stations at which the adhesive and then the cover or other binding are applied, for example as shown in United States Patents Nos. 1,248,252 and 1,867,803. In the case of magazines of substantial thickness composed of a plurality of signatures which may or may not be trimmed at the back into separate pages, such for example as the well known Reader's Digest, the cover and adhesive may be relied on entirely to retain the signature and pages in an assembled relation, or the bindings may be reinforced with stitches or wire staples.

The arrangement of the adhesive on the backs of the books may be in one of a number of different forms. For example, in the so-called "perfect" binding, a substantially even layer of adhesive is applied to the back edges of all the pages so the pages open along their back edges. In the case of a perfect binding on a paper bound book or magazine, the cover may be secured in place by the same layer of adhesive which forms the binding, in which event it will similarly open along the junctions of its back and sides. Alternatively, the adhesive may be applied both along the back of the book and also along a limited strip on both sides adjacent the back edge, in which case the cover will open along a crease spaced forwardly of the book from its back to form a hinged construction. Either type of binding may be reinforced with stitches or wire staples as desired.

In the so-called "notch" binding, the back of the book is provided with spaced notches to increase the amount of adhesive at the resulting spaced positions along the backbone, and in this type of binding the adhesive in the notches forms a hinge spaced forwardly of the back edge of the book along which the pages open. In this form of binding, the hinged cover arrangement is also employed in a paper bound book to provide effective concealment of the notches. Also in this type of binding, if the signatures are not fully trimmed, the adhesive may be forced into the V-shaped spaces therebetween along the back of the book to increase the strength of the binding.

In all the above cases, rapid and accurately metered control of the application of adhesive is important not only from the standpoint of strength and an attractive appearance for the binding, but especially for reasons of economy, since the adhesives used for such purposes are relatively costly and a reduction of the adhesive thickness of only a few thousandths of an inch per book may result in an overall saving of many thousands of dollars on even a single issue of a magazine having a monthly circulation measured in millions. The present invention is accordingly directed to the provision of apparatus for effecting such controlled and metered application of adhesive to successive books in binding operations of the above general character, and in particular, it is a major object of the invention to provide apparatus for extruding adhesive into contact with the backs of successive books to be bound in which the applied adhesive is accurately metered and controlled with respect to both the quantity thereof and to the area along the back of the book to which the adhesive is applied.

Another object of the invention is to provide such apparatus which will apply the adhesive with uniformly controlled accuracy in accordance with the particular type of binding to be used, which is readily adjustable to accommodate different lengths or widths of books and different types of binding, and which may be readily installed on existing conventional book binding machines for operation in accurately coordinated relation therewith.

Additional objects of the invention are to provide such apparatus in which the adhesive is extruded under pressure against the backs of successive books traversing a work station to assure proper thickness and penetration of adhesive in the notches or other crevices in the backbones of the books, and also to provide such apparatus in which accurate control is effected of the side edges of the applied glue line in accordance with whether or not the hinged type of cover binding is desired.

A further object of the invention is to provide such apparatus in which the application of adhesive is controlled intermittently in coordinated relation with the movement of successive books through a work station, and a still further object is to provide such apparatus in which the application of adhesive is prevented in the event of a gap in the line of successive books carried by the conveyor mechanism of the book binding machine.

It is also an object of the invention to provide such apparatus wherein control of the adhesive supply to the work station for application is effected in coordinated relation with the main drive for the book binding machine in such manner that when the machine is shut off and is coasting to a stop, the adhesive supply is similarly shut off gradually to assure application of adhesive to all books traversing the work station before the machine has completely ceased its forward travel.

Other objects and advantages of the invention will be apparent from the following description, the accompanying drawings and the appended claims.

Figure 1:
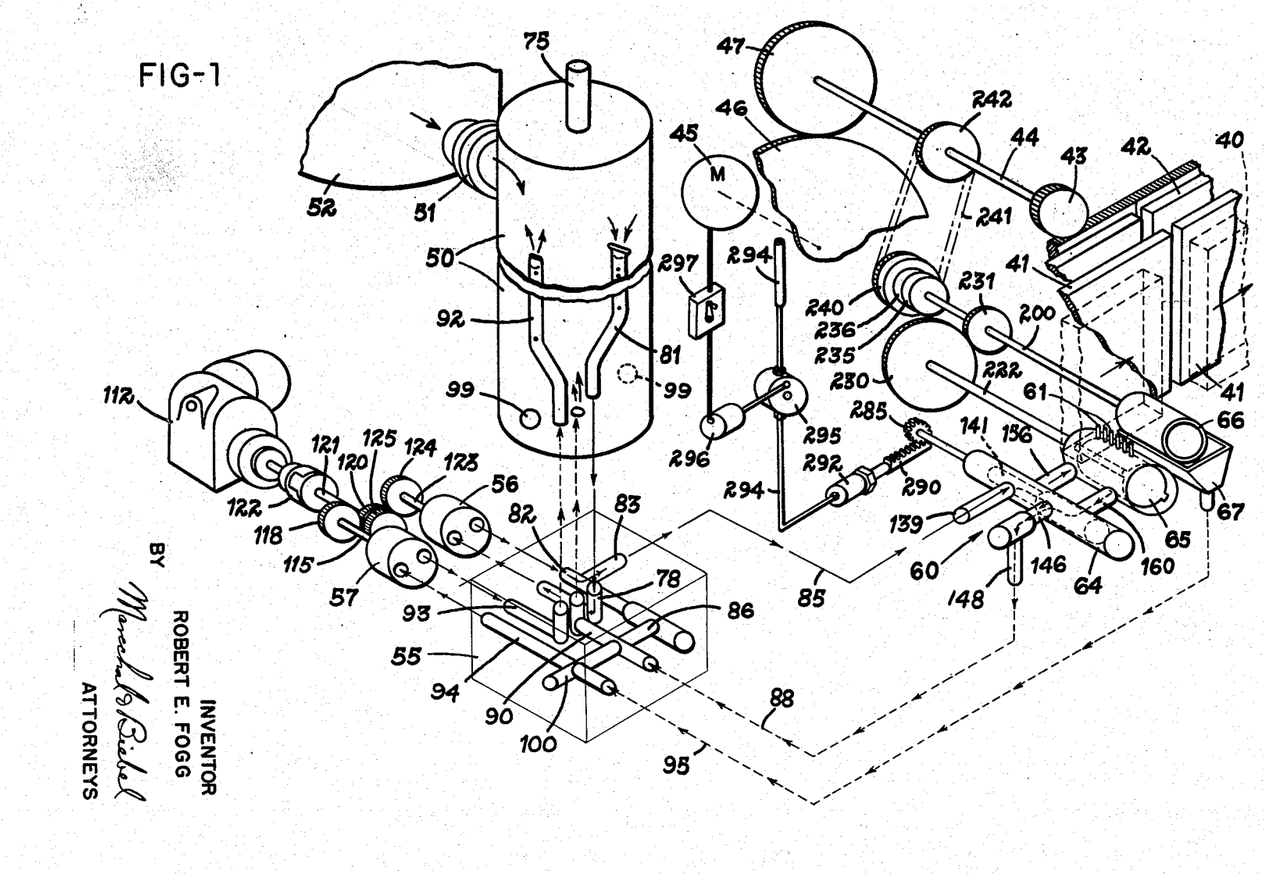
Fig. 1 is a schematic view in the nature of a perspective illustrating the general arrangement and operation of adhesive applying apparatus constructed in accordance with the invention for use with a thermoplastic adhesive.

Referring to the drawings, which illustrate preferred embodiments of the invention, Fig. 1 shows in schematic outline the general arrangement and operation of the apparatus. The successive books shown in dotted outline at 40 are carried by clamps 41 and 42 connected to form a continuous conveyor. The inner clamp member 42 carries rack teeth adjacent its upper edge adapted to be driven by a gear 43 on a shaft 44 which is in turn driven as indicated diagrammatically from the main drive motor 45 through gears 46 and 47, representing the gear in the binding machine which drives the mechanism for conveying successive covers into position for application to the books as the adhesive is applied thereto. As shown in detail in Fig. 13, the clamps 41—42 support each book with a small portion along the back edge thereof projecting downwardly for application of the adhesive and cover.

The apparatus as shown in Fig. 1 is designed for use with a thermoplastic adhesive, and the adhesive supply system accordingly includes a combined heater and reservoir 50 which receives fresh adhesive by gravity flow at 51 from a main supply source 52 and cooperates with the pumping unit to maintain the adhesive in circulating flow at the proper temperature for use. The pumping units include a pump block 55 cooperating with a pair of pumps 56 and 57 to supply the molten adhesive under pressure from the reservoir 50 to the extruder unit, which is indicated generally at 60, for application through the series of extrusion orifices 61 to the successive books as they are carried through this work station by the conveyor clamps.

The extruder 60 includes a shutoff or flow control valve 64 and also a rotary valve 65 driven in timed relation with the clamp units and books to cause extrusion only while a book is in position over the orifices 61 to receive the adhesive, and a spinner or metering roll 66 is mounted in the extruder unit beyond the orifices 61 to remove excess adhesive from the successive books into a trough 67. Passages are provided between the pump block and the extruder and also in the pump block for cooperation with the pump to recirculate the adhesive to the reservoir 50 during inoperative intervals of the extruder, as when no book is in position to receive the adhesive and valve 65 is closed, and also to recirculate the excess adhesive from trough 67.

The construction and operation of the reservoir and pump unit are shown in detail in Figs. 2 to 5. The reservoir 50 includes a shell 70 of aluminum or other good heat conducting material, and a plurality of electrical heating elements 71 are mounted in axially spaced circumferential grooves in the outer surface of shell 70 by means of clamps 72. An insulating housing 73 is provided for the reservoir, as well as a top 74 provided with a vent pipe 75 and an insulating cap 76. The bottom 77 of the reservoir is mounted directly on the pump block and includes a bore 78 therethrough connecting directly with a bore 80 in pump block 55 for gravity flow of the adhesive. A tube 81 having inlet perforations is mounted in bore 78 and is bent to one side to extend upwardly within the reservoir in close relation with the heated shell 70 where the adhesive is first melted in the warm-up period at the start of operation with the machine, thus assuring that circulation will be established early in the warm-up period.

Figures 2, 3, 4, 5:
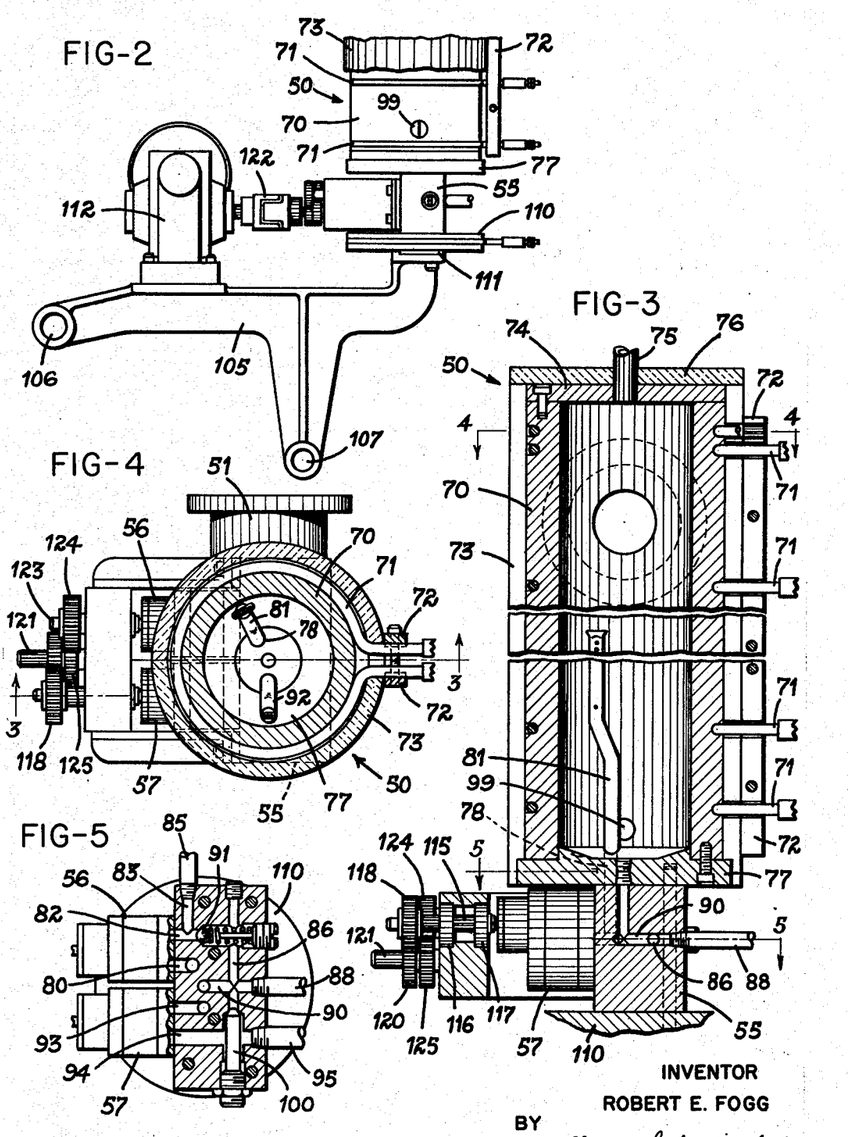
Fig. 2 is a view in side elevation showing a part of the adhesive supply system of the apparatus, including a part of the heater-reservoir, the pump unit and drive, and the supporting bracket.
Fig. 3 is a vertical view and vertical section through the heater-reservoir, the view being in section approximately on the line 3—3 of Fig. 4.
Fig. 4 is a section on the line 4—4 of Fig. 3.
Fig. 5 is a sectional view of the pump block taken on the line 5—5 of Fig. 3.

The bore 80 leads directly to the suction side of the pump 56, and the passage 82 from the discharge side of pump 56 connects directly with a passage 83 and tube 85 leading to the extruder 60. A cross passage 86 in pump block 55 is connected at approximately the middle of the pump block with the tube 88 for returning adhesive from the extruder when either of the valves 64 and 65 is closed, and a passage 90 leads from passage 86 through part 77 into the bottom of reservoir 50 for recirculating adhesive to the reservoir. A check valve 91 provides a direct connection from the discharge passage 82 to the passage 86 for recirculating the adhesive if tube 85 should be blocked, as when the device is starting up and all lines are not yet sufficiently heated for free flow of adhesive. A perforated tube 92 similar to tube 81 extends upwardly within the reservoir from the discharge side 93 of pump 57 to recirculate adhesive to the reservoir close to the heated shell 70. The suction side 94 of pump 57 is connected by a tube 95 with the trough 67 in the extruder, and the lower end of shell 70 is also provided with one or more drain ports 99 having suitable plugs as shown. A check needle 100 is located at the opposite end of passage 86 from check valve 91 and is adjustable to provide a fixed orifice for admitting to passage 94 some of the return flow of adhesive from the tube 88.

The reservoir 50 and pump block 55 are carried by a bracket 105 adapted at 106 and 107 for mounting directly on a conventional book binding machine such as the general type shown in the above noted patents. A heating unit 110 and insulating layer 111 are inserted between the pump block 55 and bracket 105 to maintain the pump block at the proper temperature to maintain the thermoplastic adhesive in fluid condition as it circulates therethrough. The bracket 105 also supports a motor 112, shown as of the gear head type, for driving the pumps 56 and 57, which are shown as gear pumps for developing positive pressure in the adhesive supply line. The drive shaft 115 for pump 57 is supported by bearings 116 in a block 117 and carries a gear 118 meshing with a drive gear 120 on a shaft 121 connected as by a universal coupling 122 with the drive shaft of motor 112. The drive shaft 123 of pump 56 is similarly supported in the block 107 and carries a gear 124 meshing with the drive gear 125 on shaft 121. Thus in order to change the volume conditions in the adhesive supply line, it is merely necessary to replace these four gears as required for the desired speed and delivery rate of the pump. It should also be noted that if a non-thermoplastic adhesive is used, the heating elements may be dispensed with but the remainder of the pump and reservoir system will function in the same manner.

The construction and operation of the extruder 60 are shown in detail in Figs. 6 to 13. The main body of the extruder is formed of side blocks 130 and 132, and a central block 131 secured together and to the main supporting plate 133 located at one side of block 130 by bolts 134. The block 133 is fitted with suitable heaters indicated diagrammatically at 135 (Fig. 7), such as cartridge type electric heaters, for maintaining the extruder unit at the proper temperature for free flow of the thermoplastic adhesive. The supply line 88 from the pump block connects with a passage 139 (Fig. 11) in block 130 which leads into a bore containing the flow control valve 64, and this passage is adapted to match a port 140 to the central bore 141 in valve 64 in the open position of the latter and another port 142 in the closed position of valve 64. The bore 141 is provided with a relief valve 143 controlling the communication from bore 141 to a pair of ports 144 and 145 adapted to match a passage 146 in block 131 in the open and closed position of valves 65 respectively, and the passage 146 is provided with a check valve 147 controlling communication with a passage 148 which in turn connects with the return line 88 to the pump block.

Figure 9:
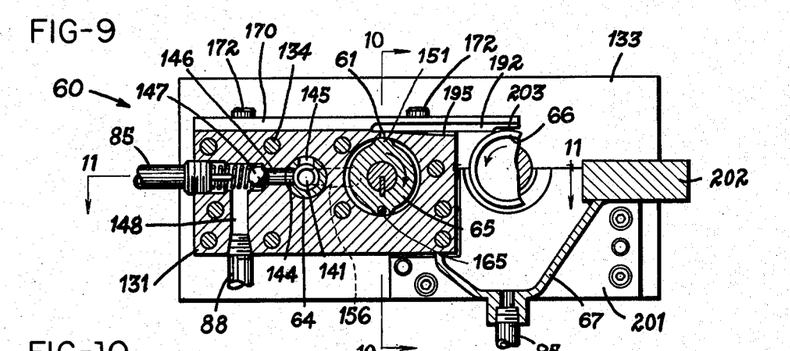
Fig. 9 is a section on the line 9—9 of Fig. 7.
Figures 10, 11, 12, 13, 14:
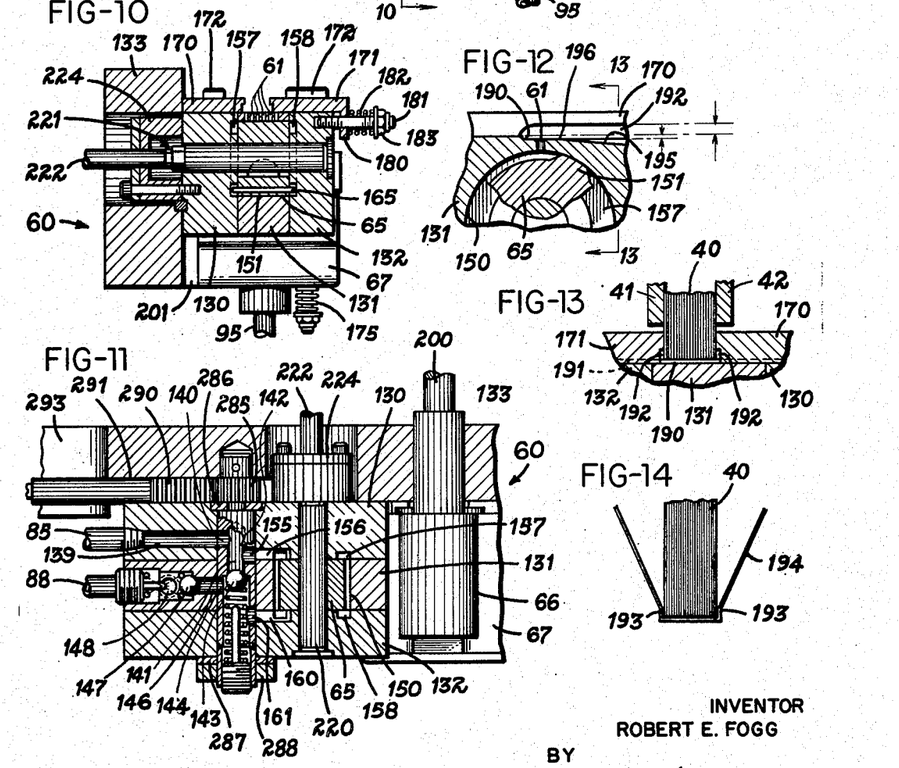
Fig. 10 is a section on the line 10—10 of Fig. 9.
Fig. 11 is a section on the line 11—11 of Fig. 9.
Fig. 12 is a fragmentary view taken on the line 9—9 of Fig. 7 but on a larger scale and showing the rotary valve open.
Fig. 13 is a fragmentary view on the line 13—13 of Fig. 12 showing the book traversing the extruder to receive adhesive therefrom for the application of a cover with the hinged type of binding.
Fig. 14 is a view showing the book of Fig. 13 with the cover applied.
Figure 15:
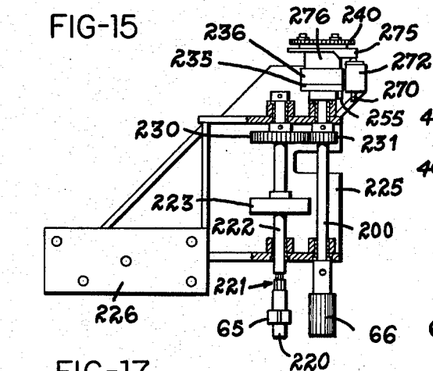
Fig. 15 is a subassembly view partly in plan and partly broken away showing the drive for the extruder of Fig. 6.
Figure 16:
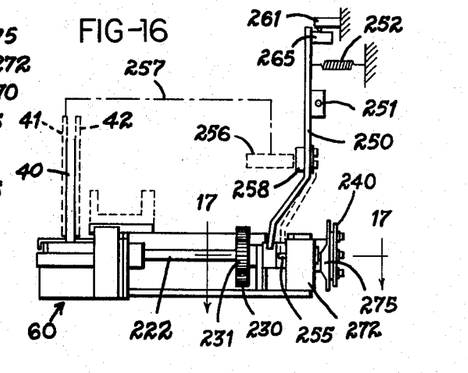
Fig. 16 is an elevational view looking from right to left in Fig. 15.

The rotary valve 65 operates in a chamber 150 in block 131 from which the orifices 61 lead for extruding the adhesive, and it is formed with two lands 151 thereon adapted to open and close orifices 61 intermittently as the valve rotates as shown in Figs. 9 and 12, the side edges of these lands being beveled as shown to prevent abrupt opening and closing action. Adhesive is supplied to chamber 150 through a port 155 in valve 64 and a flow passage 156 formed in the wall of block 130 for connecting with an annular passage 157 at one end of chamber 150. A similar annular passage 158 is formed at the opposite end of chamber 150 in the wall of block 132 and is connected by a flow passage 160 with a port 161 opening into the interior of valve 64 on the low pressure side of check valve 143 for direct connection to the port 144.

Thus when both valves 64 and 65 are open, there will be a direct flow of adhesive from the pressure supply tube 85 through the passage 139, port 140, bore 141, port 155 and passage 156 into the chamber 150 from which it will be extruded through the orifices 61 under the pressure developed by pump 56. When the valve 65 is closed, the adhesive will flow from one end of chamber 150 to the other end, and thence by way of flow passage 160 and port 161 through the valve 64 to port 144 and passage 146 to force open valve 147 for return flow through passage 148 and tube 90 to the pump block. When the valve 64 is closed, the adhesive will enter bore 141 from passage 139 through port 142, forcing open the check valve 143 for return flow to the pump block by way of port 145, passage 146, check valve 147 and passage 148. Thus continued recirculation of the adhesive is assured to prevent possible setting up within the extruder, and in addition the valve 65 carries a pin 165 (Fig. 10) extending into the annular passages 157 and 158 to maintain agitation of the adhesive therein.

Figure 7:
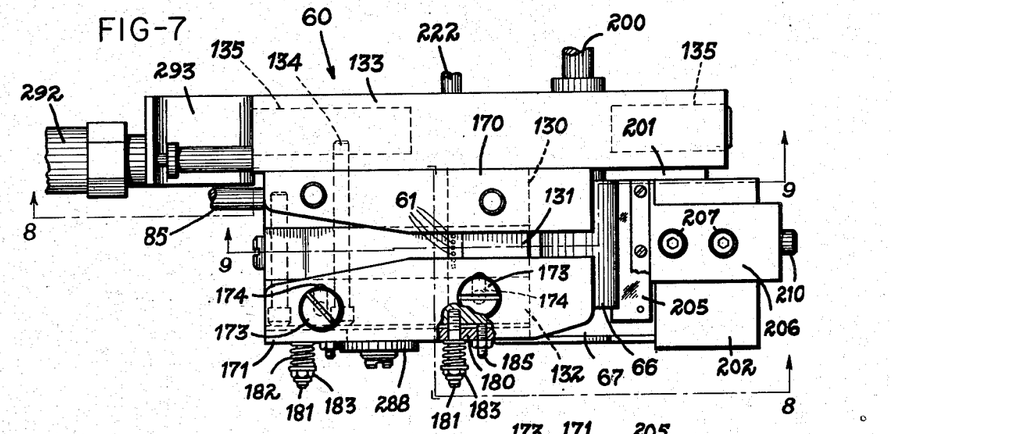
Fig. 7 is a plan view, partly broken away, of the adhesive extruder unit.
Figure 8:
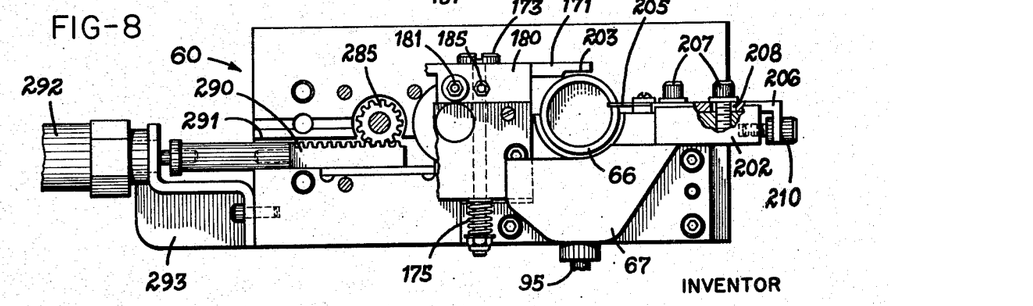
Fig. 8 is a view of the extruder partly in side elevation and partly in section as indicated by the line 8—8 of Fig. 7.

The extruder 60 is provided with a pair of laterally adjustable guide plates 170 and 171 (Figs. 7 and 10) which guide the successive books across the orifices 61 and at the same time cooperate with the block 131 to provide accurately metered control of the adhesive applied to the books, The guide plate 170 is bolted to side block 130 at 172 with its inner edge overhanging center block 131 as shown in Figs. 10 and 13 and forms the fixed guide. The guide plate 171 is adjustably mounted on block 132 by means of bolts 173 fitting in slots 174 (Fig. 7) in the guide plate and provided with compression springs 175 (Fig. 8). Guide plate 171 includes flange portions 180 along its outer edge which are yieldably and adjustably secured to side block 132 by bolts 181 for carrying springs 182, controlled by nuts 183, and flanges 175 also carry adjustable stop bolts 185 (Fig. 7) adapted to abut the outer face of block 132 to limit movement of guide plate 171 inwardly towards guide plate 170.

Figure 6:
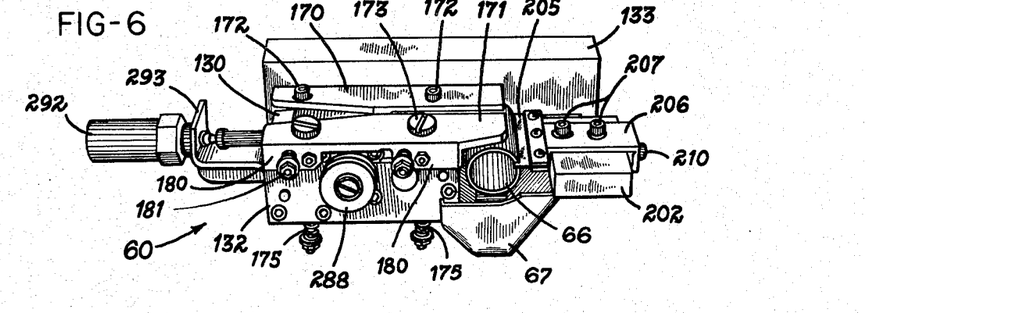
Fig. 6 is a perspective view of the adhesive extruder unit of the apparatus.

The bolts 181 and nuts 183 are adjustable as desired to change the position of guide plate 171 in accordance with the width of the particular books to be bound, it being noted that as guide plate 171 is thus adjusted, it will cover or expose certain of the orifices 61 as required to establish the correct feed of the adhesive for the particular width or thickness of the books. The springs 182 maintain guide plate 171 in pressure engagement with the book, and this has the dual effect of preventing leakage of adhesive upwardly on the outside of the books and also preventing possible flaring of the pages or signatures at the back of the book under pressure of the extruded adhesive. As shown in Figs. 6 and 7, the guide plates are beveled at their entering ends to lead successive books into the desired pressure engagement therebetween ahead of the orifices 61.

The extruder 60 is so mounted with relation to the remainder of the book binding machine that each successive book 40 initially rides in close relation with the upper surface of block 131. Just ahead of the orifices 61, block 131 is relieved by a predetermined small amount, indicated at 190 in Fig. 12, to provide a clearance below the bottom edge of the block for the adhesive to be applied in desired thickness, satisfactory results having been obtained with this clearance of the order of 0.012 inch. A similar clearance 191 is provided in the side blocks 130 and 132 (Fig. 13), but the guide plates 170 and 171 are formed as shown to fit within these relieved portions and thereby to seal against lateral spreading of the adhesive. However, the guide plates are shown as formed with longitudinal relieved portions 192 along their lower edges which provide for applying adhesive along the side edges of the book to form the hinge type of cover construction shown at 193 for the cover 194 in Fig. 14.

In addition to the clearance 190, the block 131 is cut away at 195 at a position spaced beyond the orifices 61 to leave a land 196 just following the orifices 61. For optimum results from the standpoint of efficiency and economy in adhesive application, the land 196 should be narrow in the direction of travel of the books thereacross, highly satisfactory results having been obtained with this dimension only approximately ¼ inch. With this construction, the adhesive is accurately metered onto the backs of the books immediately following its application thereto from the orifices 61, and any surplus adhesive is free to run down the relieved portion 195 to the trough 67. As a result, the thickness of the adhesive layer along the back of the book is maintained at the desired minimum effective thickness, and also the arrangement of the guide plates with their upper portions in pressure engagement with the sides of the book provides accurately metered application of the adhesive along the side edges of the books limited to the proper area for the desired hinge type of binding, thus assuring that the adhesive will be applied in the proper amount and in the correct areas while at the same time preventing spreading thereof to undesired areas such as would cause waste of adhesive as well as a possible sloppy binding.

The spinner 66 or metering roll is carried by a shaft 200 which extends through the plate 133 and supports the spinner above the trough 67 for receiving the excess adhesive. The trough 67 is welded to a plate 201 bolted to the plate 133 and forms a supporting bracket for a block 202 projecting laterally from plate 133. The spinner 66 is positioned with its upper surface in running contact with the relieved end portions 203 of guide plates 170 and 171, and the spinner rotates as shown by the arrow in Fig. 9 to meter excess adhesive from the books and also to clean the under side of the guide plates of adhesive traveling laterally thereon. The spinner is in turn cleaned by a doctor blade 205 which engages its surface and outer end as shown in Figs. 7 and 8 and which is carried by a bracket 206 adjustably mounted in a slot on the upper side of block 202 by means of bolts 207 in slots 208 (Fig. 8) and is provided with an adjustable stop bolt 210.

It is important in the operation of the apparatus that the extrusion of the adhesive through orifices 61 be accurately coordinated with the travel of the books. Thus if extrusion should occur when there is no book aligned with orifices 61, the result would be to provide a puddle of the adhesive between guides 170 and 171 in the path of the next approaching book, such that in all probability some of the adhesive would be smeared onto the end of the book with resulting waste and spoilage. Conversely, if the extrusion should not begin until after the leading end of the book had passed the orifices, part of the back of the book would receive no adhesive, and this in turn would cause incomplete binding. Accordingly, the rotary valve 65 is initially designed in proper relation with the desired speed of operation so that each land 151 will be of the proper angular extent to close the orifices 61 during the gap between successive books traveling past the orifices in the conveyor clamps, and a drive is provided which operates this valve in accurately coordinated relation with the moving books so that the orifices are opened precisely as the leading end of the book reaches them and are closed just as the trailing end of the book leaves them. In addition, provision is made for maintaining the valve closed in the event that one or more of the clamps should not have a book therein.

Referring to Figs. 1 and 15 to 19, the rotary valve 65 is keyed to a shaft 220 journaled in the blocks 130 and 132 and connected at 221 with a shaft 222 carrying a flywheel 223, the connection 221 being provided with a suitable pressure-tight seal unit indicated generally at 224. The shaft 222 is supported in a bracket 225 adapted to be secured by its supporting portion 226 to the book binding machine, and shaft 222 carries a gear 230 meshing with a gear 231 on the shaft 200 carrying spinner 66. The shaft 200 carries one member 235 of a one-way clutch driven through its complementary clutch member 236 by a sprocket 240 and chain 241 from a sprocket 242 on the shaft 44 which carries the gear 43 driving the book clamps 41—42, and these several gears and sprockets are so correlated that the valve 65 rotates in accurately timed relation with the clamps at such rate that it is in open position only during the passage of each book across the orifices 61.

The clutch 235—236 is actuated in coordinated relation with the conveying mechanism of the binding machine in such manner as to disengage in the event that there is no book in one or more of the clamps in order to retain valve 65 in closed position and prevent extrusion of adhesive. A lever 250 is pivoted on the machine at 251 and is provided with a spring 252 normally biasing it to the full line position shown in Figs. 16 and 17. The lever 250 is movable into the dotted line position shown in Figs. 16 and 17 in which its lower end is positioned in the path of a pin 255 projecting from the clutch member 235 to act as a stop for clutch member 235 and thus for shafts 232 and 222 and the valve 65. Movement of the lever 250 to its stop position is effected automatically in the event that one of the clamps 41—42 should have no book therein. For example, the outer clamp member 41 may carry a roller 256 (Fig. 16) or other projection carried thereby as indicated at 257 in such manner as to move in and out with this clamp member depending upon whether or not this clamp carries a book. Thus if there is no book in the clamp, the roller 256 will move with clamp member 41 to the right as viewed in Fig. 16 and will engage a pad 258 on lever 250 to shift the lever to its dotted line or stop position.

A detent pin 260 (Fig. 19) is carried by a bracket 261 on the machine and cooperates with recesses 262 and 263 in a block 265 at the upper end of lever 250 arranged as shown to retain lever 250 either in its stop or release position until it is positively disengaged, and means are provided for effecting its disengagement and return to its release position in accurately coordinated relation with the moving books such that valve 65 will open just as the leading end of the next book reaches the orifices 61. A pin 270 is slidably mounted behind lever 250 in a shell 271 carried by a portion 272 of bracket 225. A hollow plunger 273 is also mounted in shell 271 with its outer end projecting therefrom, and a spring 274 is located between plunger 273 and pin 270. The plunger 273 is operated by a cam 275 carried by a hollow hub 276 secured as by a set screw 277 to the clutch member 236 and bolted at 278 to the sprocket 240, and the cam and sprocket 240 are bolted together at 279.

Thus if the lever 250 is moved to its stop position, it will be subsequently pushed back to its release position when the high spot of cam 275 engages plunger 273, and in the initial adjustment of the apparatus, the cam and sprocket 240 are adjusted angularly in indexed relation with the clamps so that the lever 250 will be released just as the leading end of the next book reaches the orifices 61, so that the valve 65 will resume rotation and open for properly timed extrusion of adhesive. This angular adjustment of the cam and sprocket is readily obtained by providing arcuate slots in the sprocket through which the bolts 278 and 279 extend into the hub 276 and cam 275. If there should be a gap of more than one clamp having no books therein, then the rollers 256 on the successive empty clamps will hold the lever 250 in its stop position against pin 270, in which event passage of the high point of the cam will depress plunger 273 against spring 274 without moving lever 250.

When the book binding machine is shut off, the flow control valve 64 is closed to discontinue the supply of adhesive to the valve chamber 140 as previously described. However, since it will normally require an interval of at least a few seconds for the conveyor clamps and other parts of the machine to coast to a full stop, provision is made for similarly causing gradual closing of valve 64 so that the adhesive flow is provided so long as any books are still in motion across the orifices 61. Referring to Figs. 1, 6 to 8 and 11, the valve 64 carries a pinion 285 located within a hollowed passage in the inner wall of plate 133, the pinion 285 being provided with a thrust washer 286 bearing against a counterbore in the wall of block 130, and a similar thrust washer 287 and nut 288 being provided to the outer end of the valve. The pinion 285 is operated by a rack 290 slidable in a guideway 291 formed in the wall of plate 133, and the rack is operated by an air cylinder 292 carried by a bracket 293 extending from the end of plate 133.

The air pressure for cylinder 292 is supplied by a line 294 from a valve 295 (Fig. 1) shown as operated by a solenoid 296 connected with the main control switch 297 for the motor 45. With the valve and solenoid connected to supply air to cylinder 292 when the solenoid is deenergized, it will be seen that when the switch 297 is closed to stop motor 45, solenoid 296 will be deenergized so that air will be supplied to cylinder 292. This in turn will cause rack 290 to move to the right as shown in Fig. 8 and thus to act through pinion 285 to close valve 64, but the closing movement of the valve will be gradual instead of sudden, so that the supply of adhesive will be gradually cut off as the machine coasts to a full stop.

Figures 17, 18, 19, 20, 21, 22, 23, 24, 25, 26, 27:
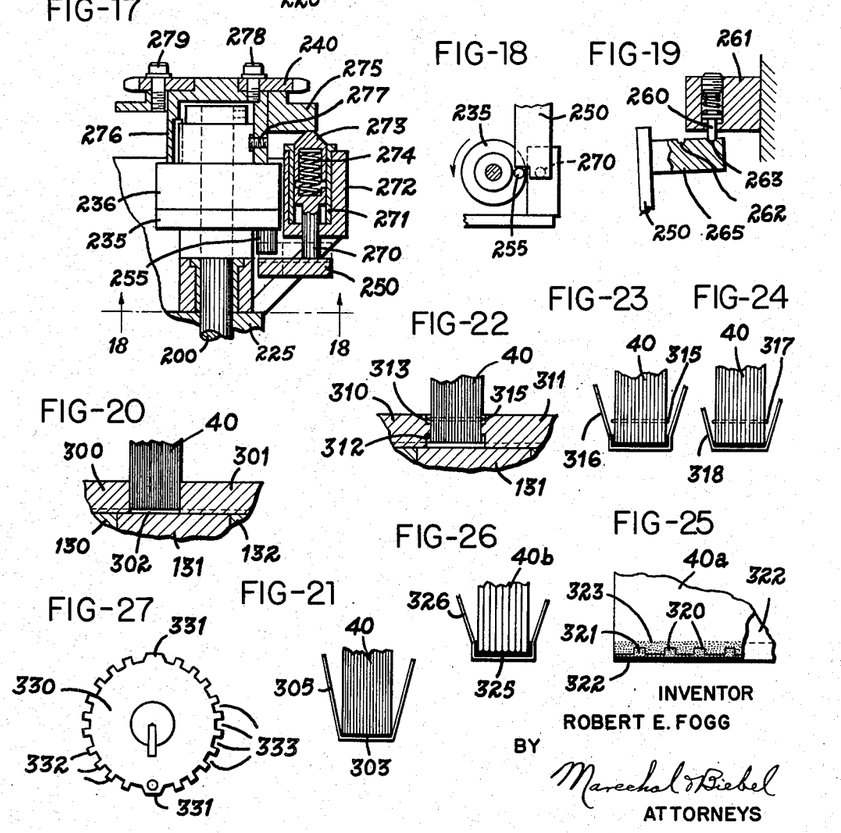
Fig. 17 is an enlarged fragmentary section on the line 17—17 of Fig. 16.
Fig. 18 is a detail view on the line 18—18 of Fig. 17.
Fig. 19 is an enlarged fragment of Fig. 16.
Figs. 20 to 26 are fragmentary views illustrating different types of bindings obtainable with the apparatus of the invention together with the modified constructions of the extruder for producing such bindings.
Fig. 27 is a fragmentary view showing a modified construction of rotary valve for applying the adhesive in successive strips across the backs of the books.
Figure 28:
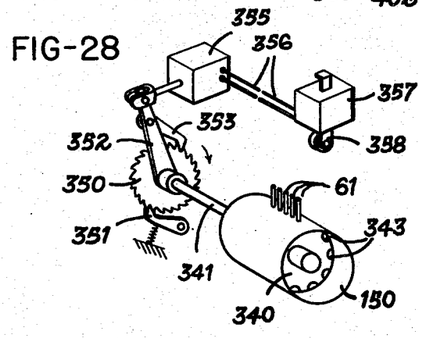
Fig. 28 is a fragmentary perspective view illustrating diagrammatically an electrically operated drive indexing the rotary valve which controls extrusion of adhesive through successive open and closed positions.
Figure 29:
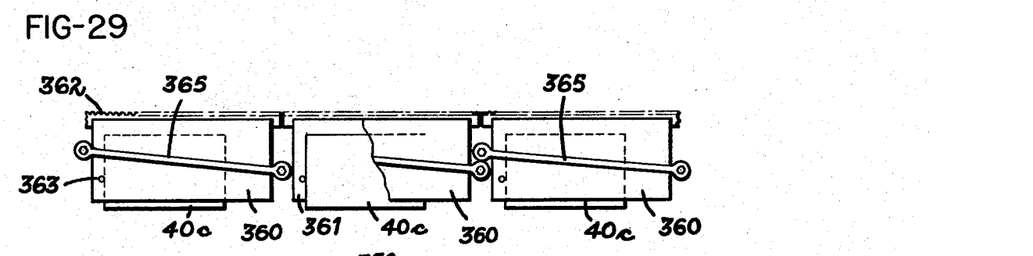
Fig. 29 is a fragmentary view in side elevation showing several of the clamping units which carry the books and also actuate the drive of Fig. 28.

Figs. 20 to 27 illustrate modified constructions of the guide plates for the extruder and different types of cover bindings obtainable therewith. Thus in Fig. 20, the guide plates 300 and 301 are completely free of the relief shown at 191 for the guide plates 170 and 171 but are similar thereto in construction. This arrangement provides clearance at 302 only along the back edge of the book 40, so that in the bound book as shown in Fig. 21, there is a layer of adhesive 303 only along the back edge of the book, and thus the cover 305 opens directly along the back edges of the book without the hinge construction shown in Fig. 14.

In Fig. 22 the guide plates 310 and 311 have relief portions 312 corresponding to the relief 191, and in addition each has a relief 313 along its upper edge for receiving the wire staple 315 of a book 40 having a side wire binding. This construction of the guides provides a bound book as shown in Fig. 23 with the cover 316 having a hinged connection similar to that shown in Fig. 14. Fig. 24 shows a side wire binding including the staple 317 in which the hinge for the cover 318 is omitted. This type of binding can be obtained in the extruder by means of guide plates similar to the plates 310 and 311 but having the relief portions 312 omitted while retaining the reliefs 313.

Fig. 25 illustrates the notch type of binding for a book 40a in which there are spaced notches 320 along the backbone of the book into which the adhesive 321 penetrates. When this type of binding is used on a magazine, the cover 322 is normally applied by means of the hinged type of connection at 323 to conceal the notches. The notch type of binding is also applicable to a book 40b (Fig. 26) in which the signatures have not been trimmed, so that there are V-shaped spaces between adjacent signatures into which the adhesive 325 for the cover 326 penetrates, this type of binding being usable either with or without notches. The extruder of the invention is especially satisfactory for these types of bindings, since the application of adhesive under pressure as described assures that it will be forced into the notches and crevices to provide the properly uniform layer for optimum strength and smoothness.

Fig. 27 shows a rotary valve 330 which corresponds to the valve 65 but is of modified construction to cause the adhesive to be initially applied to the books in a series of strips running transversely across the back of the book. As shown, the valve 330 is formed with lands 331 thereon which correspond with the lands 151, and additional shorter lands 332 extend in radially spaced relation along the valve to provide similarly extending spaced grooves 333. With this construction, the grooves 333 will be filled with adhesive under maintained pressure for extrusion through the orifices 61 as the valve rotates to bring each groove successively into register with the orifices. As a result, the adhesive will be applied to the books in transversely extending strips initially spaced from each other in the direction of travel of the books, but under normal conditions the metering effect of the land 199 and the spinner 66 will smooth these strips out into a continuous layer.

Figure 30:
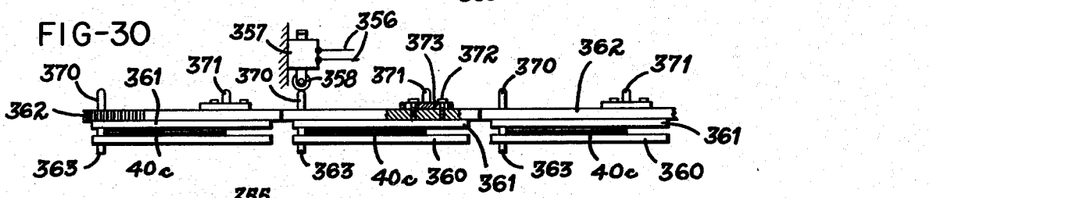
Fig. 30 is a plan view of the clamping units illustrating the arrangement for actuation thereby of the drive of Fig. 28.

Figs. 28 to 32 illustrate a modified construction of rotary valve for the extruder and an electrically operated drive for the valve which is actuated in timed relation with the travel of the successive books in the book carrying clamp units of the binding machine to supply adhesive only when a book is in proper position to receive it. The valve 340 in the chamber 150 is keyed to a shaft 341 and is provided in its outer surface with a plurality of axially arranged grooves 343 separated by lands 345, with each of these grooves 343 being arranged to receive adhesive under pressure from the annular passage 157 in the extruder. Thus when the valve 340 is in position such as shown in Fig. 30 in which one of the grooves 343 is registered with the orifices 61, adhesive will be supplied to the orifices; and when the valve is indexed to a position which as shown in Fig. 1 when one of the lands 345 is registered with the orifices 61, the supply of adhesive will be cut off.

The drive for valve 340 includes a rack wheel 350 fixed on shaft 341 and provided with a spring biased retaining pawl 351. An arm 352 is rotatably mounted on shaft 341 and carries a pawl 353 for advancing the rack wheel 350, and the arm 352 is in turn shown as operated by a solenoid 355 connected by leads 356 with a control switch 357 having an operating arm 358, the switch 357 being of a type adapted to close only when the arm 358 is depressed, and the stroke of solenoid 355 being of the proper length to rotate wheel 350 one tooth. The switch 357 is mounted as shown in Fig. 30 adjacent the path of travel of the clamping units 360—361 which correspond to the clamping members 41—42 and are similarly driven through the rack teeth 362. Each of these clamp units is shown as carrying a book 40c; and each clamp is provided with a guide pin 363 which supports the trailing end of the book therein. The bars 365 represent a portion of the conventional operating mechanism for the clamps.

Each of the clamping units 360—361 carries a pair of pins 370 and 371 adapted to engage the switch arm 358 as shown in Fig. 30. The rearward pin 370 on each clamp is located in the same vertical plane with the pin 363 to correspond to the trailing end of the book. The forward pin 371 on each clamp is provided with an adjustable mounting including the screws 372 in slots 373 to provide for accurately aligning the pin 371 with the leading end of the book carried by the clamp, this adjustment being made at the start of a binding run in accordance with the length of the particular books to be bound. With the valve 340 adjusted at the start to its closed position shown in Fig. 32, then as the successive clamps and books pass through the work station at which the extruder is located, the pins 370—371 on each successive clamp will each actuate switch 357 through arm 358 to energize solenoid 355 momentarily and thus to move the arm 352 and to advance rack wheel 350.

Figure 31:
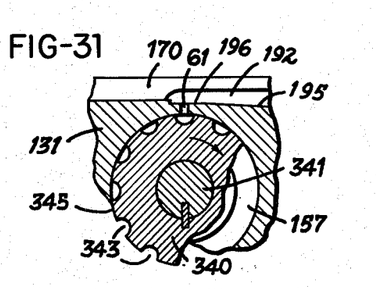
Figs. 31 and 32 are enlarged fragmentary views illustrating the operation of the valve of Fig. 28.
Figures 32, 34:
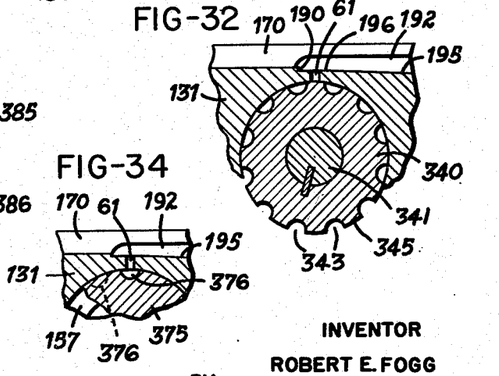
Fig. 34 is a fragmentary section further illustrating the operation of the valve of Fig. 33.

The wheel 350 is properly selected so that each stroke of solenoid 355 will move the valve 340 from closed to open position or vice versa as shown in Figs. 31 and 32, and accordingly the valve will immediately be opened just as the leading end of each book 40c reaches the orifices 61 to receive the adhesive therefrom. The valve remains open until the book has substantially passed the orifices, i. e. until the pin 370 reaches the switch arm 358, whereupon the solenoid 355 will again be energized to move the valve to closed position. It will thus be seen that this drive arrangement provides accurate correlation of the position of the valve with the positions of the successive books traversing the work station so that adhesive is extruded only when a book is in position to receive it.

Figure 33:
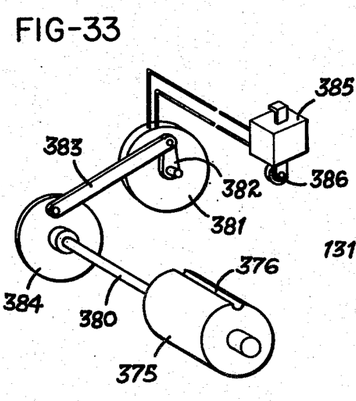
Fig. 33 is a view similar to Fig. 28 illustrating another type of valve and electrically operated drive therefor.

Figs. 33 and 34 show another form of rotary valve and electrical drive which may be installed for operation in the same manner as described in connection with Fig. 30. The valve 375 has a single surface passage 376 therein adapted to receive adhesive from the passage 157, with the remainder of the valve being cylindrically curved to close the orifices 61. The valve 375 is carried by a shaft 380 having a driven connection with a rotary solenoid 381 such that valve 375 will be oscillated in response to energizing and deenergizing of solenoid 381. For example, the solenoid may be connected to oscillate an arm 382 connected by a link 383 with a wheel 384 on shaft 380, thus forming a crank connection for oscillating the valve. The solenoid 381 is shown as controlled by a switch 385 having an operating arm 386.

If the switch 385 is of a type such that it is closed and opened by successive actuations of the arm 386, it may be mounted similarly to switch 357 in Fig. 30 for operation by the pins 370 and 371 on the clamps. The switch will then be opened to energize the solenoid and thus to rock valve 375 to open position just as the leading end of a book reaches the orifices 61, and the switch will be closed to deenergize the solenoid and thus to close the valve as the trailing end of the book leaves the orifices. If the switch 385 is of the same type as described for switch 357, then the switch can readily be mounted in such relation to the path of travel of the clamps as to be operated by the successive books themselves to assure proper correlation of the opening and closing movements of the valve with the position of each successive book with relation to the orifices 61 through which the adhesive is extruded.

Figure 35:
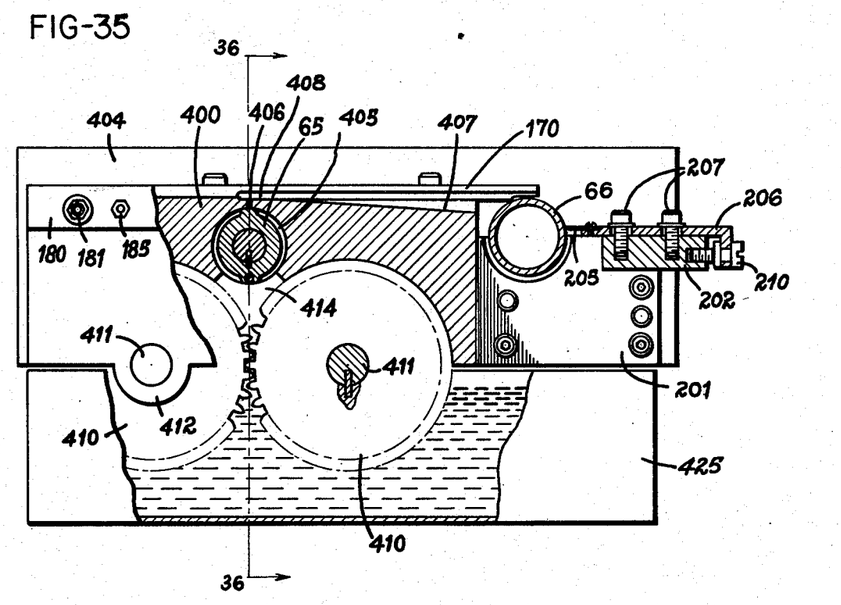
Fig. 35 is a view partly in side elevation and partly broken away in section showing a modified construction of extruder unit in accordance with the invention.
Figure 36:
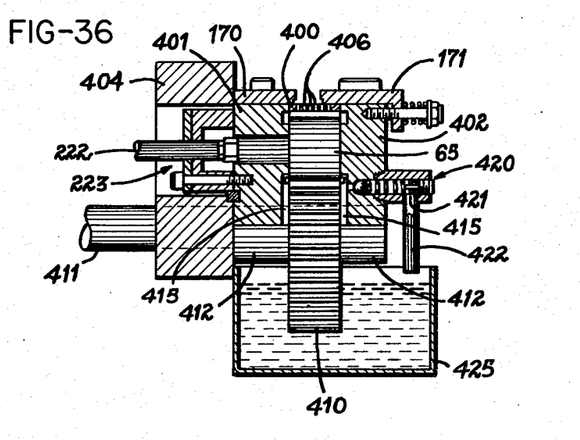
Fig. 36 is a section on the line 36—36 of Fig. 35.

Figs. 35 and 36 show a somewhat simplified construction of extruder unit which may be found desirable in some installations embodying the invention and which operates to give similarly uniform and highly economical application of adhesive in substantially the same manner as already described for the other forms of the invention. This extruder is shown as constructed similarly to the extruder 60 with the main body thereof formed of a central block 400, front and rear side blocks 401 and 402 and a main supporting plate 404 corresponding to the plate 133. The central block 400 includes a chamber 405 corresponding to the chamber 150 and provided with discharge orifices 406 corresponding to the orifices 61, and the rotary valve 65 in chamber 405 is shown as of the same construction and mode of operation as described in connection with the other views. The guide plates 170 and 171 correspond to the similarly numbered parts in the other views, and it will also be noted that the upper surface of the block 400 is provided with a relieved portion 407 and land 408 corresponding to the similar portions 195 and 196 as previously described.

This extruder includes its own pump means for supplying adhesive under pressure to the chamber 405. The center block 400 is cut away in its underside to receive a pair of cooperating pump gears 410 having their shafts 411 supported in bracket portions 412 of the side blocks 401 and 402. The central block 400 is also cut away adjacent the pressure side of the gears 410 to form a discharge chamber 414 for receiving the output of the pump gears, and the chamber 414 is directly connected with the chamber 405 through the annular passages 415 in the inner face of blocks 401 and 402. A pressure relief valve 420 is mounted as shown in the front block 401 and is connected with the passage 415 to control the maximum pressure in chamber 414, the valve 420 having an outlet passage 421 shown as provided with a discharge tube 422.

In use, this extruder may be mounted directly on a glue pot 425 or other container in such manner that the lower portions of the pump gears 410 will be received below the level of adhesive in the pot for proper pumping operation. The discharge tube 422 from the relief valve may then be arranged to discharge back into the pot 425, and similarly the unit may be mounted in such manner as shown that the pot 425 will receive directly the adhesive draining from the block 400 and the spinner 66. It will thus be seen that this extruder constitutes in effect a complete and self-contained unit which can readily be installed in the same manner as shown for the extruder 60 and provided with appropriate drive connections as described for operating the pump gears and the valve 65 at the proper rate and in timed relation with the movements of the books to be bound. The adhesive picked up by gears 410 is supplied to chambers 414 and 405 under desired maintained pressure, since if the pressure becomes excessive, valve 420 will open for relief. It will also be apparent that if desired, heaters may be incorporated in this unit in a manner similar to that illustrated at 135 in Fig. 7.

It will accordingly be seen that the present invention provides apparatus for extruding adhesive onto the backs of books in a book binding machine which will operate to effect highly accurately controlled and metered application of the adhesive to the books for different types of bindings as desired. This apparatus therefore offers important advantages from the standpoint of uniformity and high quality of the bindings obtained therewith, and at the same time it is outstanding from the standpoint of economy, since the controlled and accurately metered application of the adhesive assures that no more than the proper required amount of adhesive will be used on each book and thus effectively minimizes waste. In addition, as pointed out, this apparatus does not require special book binding equipment but is readily adaptable to conventional book binding machines for operation in accurately timed relation with the travel of the successive books through the binding and other work stations on the machine.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for applying a fluid adhesive to the backs of successive books in a book binding machine including means for conveying successive said books lengthwise through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom progressively as said book moves past said orifice, means for conveying said fluid adhesive from said reservoir to said orifice under pressure for pressure discharge through said orifice into contact with said aligned backs of said books, said guiding means and said orifice being proportioned with respect to the width of said books to locate the entire width of the back of each said book in direct communication with said orifice in moving therepast, and yieldable means for maintaining said guide means in pressure engagement with the sides of each said book adjacent the back thereof to limit the area on said book to which said adhesive is applied while maintaining the entire width of the back of said book in direct communication with said orifice for uniform coating thereof with said adhesive.

2. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means for conveying said fluid adhesive from said reservoir to said orifice under pressure for pressure discharge through said orifice into contact with said aligned backs of said books, means for maintaining said guide means in pressure engagement with the sides of each said book adjacent the back thereof to limit the area on said book to which said adhesive is applied, and means operated in timed relation with said conveying means for intermittently interrupting the supply of adhesive to said orifice when no book is aligned with said orifice to prevent flow of said adhesive into the path of other portions of the outer surfaces of said books.

3. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means including a positive discharge pump for conveying said fluid adhesive from said reservoir to said orifice under pressure for pressure discharge through said orifice into contact with said aligned backs of said books, means for maintaining said guide means in pressure engagement with the sides of each said book adjacent the back thereof to limit the area on said book to which said adhesive is applied, means including a valve operated in timed relation with said conveying means for intermittently opening said orifice as each said book passes said orifice and for closing said orifice when no book is aligned therewith, and means for recirculating said adhesive to said reservoir during the closed intervals of said valve.

4. Apparatus for applying a fluid adhesive to the backs of successive books in a book binding machine including means having a drive for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means for conveying said fluid adhesive from said reservoir to said orifice under pressure for pressure discharge though said orifice into contact with said aligned backs of said books, means for maintaining said guide means in pressure engagement with the sides of each said book adjacent the back thereof to limit the area on said book to which said adhesive is applied, a valve controlling the supply of adhesive to said orifice, and means operated in response to discontinuance of said drive for effecting gradual closing of said valve over a limited time interval corresponding to the time required for said conveying means to reach a full stop providing for completing application of adhesive to all said books passing said orifice following said discontinuance of said drive.

5. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means for conveying said fluid adhesive from said reservoir to said orifice under pressure for pressure discharge through said orifice into contact with said aligned backs of said books, means for maintaining said guide means in pressure engagement with the sides of each said book adjacent the back thereof to limit the area on said book to which said adhesive is applied, means positioned in the path of travel of said books beyond said orifice for metering excess adhesive from said books, and means for recirculating said excess adhesive to said reservoir.

6. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means for conveying said fluid adhesive from said reservoir to said orifice under pressure for pressure discharge through said orifice into contact with said aligned backs of said books, means for maintaining said guide means in pressure engagement with the sides of each said book adjacent the back thereof to limit the area on said book to which said adhesive is applied, means including a valve operated in timed relation with said conveying means for intermittently opening said orifice as each said book passes said orifice and for closing said orifice when no book is aligned therewith, means for recirculating said adhesive to said reservoir during the closed intervals of said valve, means positioned in the path of travel of said books beyond said orifice for metering excess adhesive from said books, and means for recirculating said excess adhesive to said reservoir.

7. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means for conveying said fluid adhesive from said reservoir to said orifice under pressure for pressure discharge through said orifice into contact with said aligned backs of said books, means for maintaining said guide means in pressure engagement with the sides of each said book adjacent the back thereof to limit the area on said book to which said adhesive is applied, a valve controlling the supply of adhesive to said orifice and movable between open and closed positions, and means for operating said valve in timed relation with said conveying means to open said valve as the leading end of each said book reaches said orifice and to close said valve as the trailing end of each said book leaves said orifice for accurately controlled application of adhesive to each said book.

8. Apparatus for applying a fluid adhesive to the backs of successive books in a book binding machine provided with means including a plurality of clamping means for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means for conveying said fluid adhesive from said reservoir to said orifice under pressure for pressure discharge through said orifice into contact with said aligned backs of said books, means for maintaining said guide means in pressure engagement with the sides of each said book adjacent the back thereof to limit the area on said book to which said adhesive is applied, a valve controlling the supply of adhesive to said orifice and movable between open and closed positions, means for operating said valve in timed relation with said conveying means to open said valve as the leading end of each said book reaches said orifice and to close said valve as the trailing end of each said book leaves said orifice, and means operated by said clamping means for preventing opening of said valve upon the passage past said orifice of one of said clamping means having no book therein.

9. Apparatus for applying a fluid adhesive to the backs of successive books in a book binding machine including means for conveying successive said books through a work station, comprising means forming a reservoir for maintaining a quantity of said adhesive in fluid condition, means at said work station forming an adhesive chamber having a discharge orifice, a valve mounted for rotational movement in said chamber and including a surface portion adapted to close said orifice, an inlet for adhesive at one end of said chamber, means for supplying said fluid adhesive from said reservoir under pressure to said chamber through said inlet, an outlet for adhesive at the opposite end of said chamber, said valve having a surface portion thereof relieved with respect to the wall of said chamber providing for pressure flow of said adhesive from said inlet to said orifice in the open position of said valve and for pressure flow of said adhesive from said inlet to said outlet in the closed position of said valve, and means for effecting rotational movement of said valve in timed relation with said conveying means to move said valve to said open position thereof as the leading end of each said book reaches said orifice and to move said valve to said closed position thereof as the trailing end of each said book leaves said orifice.

10. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, a pair of guides cooperating with said conveying means to guide the backs of successive said books into aligned relation with said orifice to receive adhesive therefrom, means for securing one of said guides in fixed relation with said orifice, means supporting the other said guide in laterally movable relation with said orifice, means for conveying said fluid adhesive from said reservoir to said orifice under pressure for pressure discharge through said orifice into contact with said aligned backs of said books, and means for biasing said movable guide towards said fixed guide to maintain the adjacent faces of said guides in pressure engagement with the sides of each said book adjacent the back thereof to limit the area on said book to which said adhesive is supplied.

11. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, a pair of guides cooperating with said conveying means to guide the backs of successive said books into aligned relation with said orifice to receive adhesive therefrom, means for securing one of said guides in fixed relation with said orifice, means supporting the other said guide in laterally movable relation with said orifice, means for conveying said fluid adhesive from said reservoir to said orifice under pressure for pressure discharge through said orifice into contact with said aligned backs of said books, each said guide having a relieved portion along the edge thereof adjacent said orifice, and means for biasing said movable guide toward said fixed guide to maintain the adjacent faces of said guides in pressure engagement with the sides of each said book along a line spaced from the back thereof and with said relieved portions of said guides cooperating to effect application of adhesive along the sides of said book adjacent the back thereof as well as on the back of said book.

12. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, a pair of guides cooperating with said conveying means to guide the backs of successive said books into aligned relation with said orifice to receive adhesive therefrom, means for securing one of said guides in fixed relation with said orifice, means supporting the other said guide in laterally movable relation with said orifice, means for conveying said fluid adhesive from said reservoir to said orifice under pressure for pressure discharge through said orifice into contact with said aligned backs of said books, means for biasing said movable guide towards said fixed guide to maintain the adjacent faces of said guides in pressure engagement with the sides of each said book adjacent the back thereof to limit the area on said book to which said adhesive is supplied, said guides extending for a substantial distance beyond said orifice, a roll supported at a position beyond said orifice in predetermined spaced relation with the underside of said guides, and means for rotating said roll for cooperation with said guides to meter the layer of adhesive on said books.

13. Apparatus for extruding adhesive onto the backs of successive books in a binding operation comprising a main body having a chamber therein adapted to be supplied with adhesive under pressure, said chamber having a discharge orifice extending through an exposed surface of said main body for discharge of said adhesive under pressure, valve means supported by said body for movement between positions respectively opening and closing said orifice, means on said surface of said body for guiding the backs of successive books into aligned relation with said orifice to receive adhesive therefrom, said body having a land thereon located immediately beyond said orifice, said land being short in the direction of travel of said books thereacross to meter the adhesive applied to said books from said orifice, and said body having a relieved portion thereon immediately following said land preventing accumulation of adhesive adjacent said land and said orifice and thereby cooperating with said land to maintain a uniformly thin layer of adhesive on each said book.

14. Apparatus for extruding adhesive onto the backs of successive books in a binding operation comprising a main body having a chamber therein adapted to be supplied with adhesive under pressure, said chamber having a discharge orifice extending through an exposed surface of said main body for discharge of said adhesive under pressure, valve means supported by said body for movement between open positions respectively opening and closing said orifice, means on said surface of said body for guiding the backs of successive books into aligned relation with said orifice to receive adhesive therefrom, yieldable means for maintaining said guide means in pressure engagement with the sides of each said book adjacent the back thereof to limit the area on said book to which said adhesive is applied, and means operated in timed relation with said conveying means for intermittently shifting said valve means between said open and closed positions thereof to interrupt the supply of adhesive to said orifice when no book is aligned therewith.

15. Apparatus for extruding adhesive onto the backs of successive books in a binding operation comprising a main body having a chamber therein adapted to be supplied with adhesive under pressure, said chamber having a discharge orifice extending through an exposed surface of said main body for discharge of said adhesive under pressure, a valve supported for rotational movement within said chamber, said valve including a portion dimensioned to close the inner end of said orifice when aligned therewith and having another portion relieved with respect to the first named said portion and adapted when aligned with said orifice to provide passage for adhesive from said chamber to said orifice, means on said surface of said body for guiding the backs of successive books into aligned relation with the outer end of said orifice to receive adhesive therefrom, and means for maintaining said guide means in pressure engagement with the sides of each said book adjacent the back thereof to limit the area on said book to which said adhesive is applied.

16. Apparatus for extruding adhesive onto the backs of successive books in a binding operation comprising a main body having a chamber therein adapted to be supplied with adhesive under pressure, said chamber having a plurality of discharge orifices extending through an exposed surface of said main body for discharge of said adhesive under pressure, said orifices being relatively aligned transversely of the direction of travel of said books thereacross, valve means supported by said body for movement between positions respectively opening and closing said orifices, means on said surface of said body for guiding the backs of successive books into aligned relation with said orifices to receive adhesive therefrom, means for maintaining said guide means in pressure engagement with the sides of each said book adjacent the back thereof to limit the area on said book to which said adhesive is applied, and means for adjusting said guide means with respect to each other to vary the effective space therebetween in accordance with the thickness of the books to be bound, at least one of said guide means being movably secured to said body in position to close one or more of said orifices as said guide means are adjusted in accordance with the desired effective flow area of said orifices.

17. Apparatus for extruding adhesive onto the backs of successive books in a binding operation comprising a main body having a chamber therein adapted to be supplied with adhesive under pressure, said chamber having a discharge orifice extending through an exposed surface of said main body for discharge of said adhesive under pressure, valve means supported by said body for movement between positions respectively opening and closing said orifice, means on said surface of said body for guiding the backs of successive books into aligned relation with said orifice to receive adhesive therefrom, and pump means carried by said body and having the discharge side thereof connected with said chamber for supplying adhesive under pressure to said chamber for discharge therefrom through said orifice.

18. Apparatus for extruding adhesive onto the backs of successive books in a binding operation comprising a main body having a chamber therein adapted to be supplied with adhesive under pressure, said chamber having a discharge orifice extending through an exposed surface of said main body for discharge of said adhesive under pressure, valve means supported by said body for movement between positions respectively opening and closing said orifice, means on said surface of said body for guiding the backs of successive books into aligned relation with said orifice to receive adhesive therefrom, cooperating pump gears supported in said body, means connecting the discharge side of said pump gears with said chamber, and means for supporting said body with the lower portions of said pump gears received within a supply of fluid adhesive to cause said gears to convey said adhesive to said chamber under pressure for discharge therefrom through said orifice.

19. Apparatus for applying a fluid adhesive to the backs of successive books in a book binding machine including means for conveying successive said books through a work station, comprising means at said work station forming a discharge orifice for said adhesive, means cooperating with said conveying means to guide the backs of successive said books into aligned relation with said orifice to receive adhesive therefrom, means forming a reservoir for maintaining a quantity of said adhesive in fluid condition, a pump, means connecting the suction side of said pump with said reservoir, means connecting the discharge side of said pump with said work station for conveying said fluid adhesive from said reservoir to said orifice under pressure for pressure discharge through said orifice, and means including a check valve for connecting the discharge side of said pump to said reservoir for recirculating said adhesive to said reservoir when said connection to said work station is closed.

20. Apparatus for applying a fluid adhesive to the backs of successive books in a book binding machine including means for conveying successive said books through a work station, comprising means at said work station forming a discharge orifice for said adhesive, means cooperating with said conveying means to guide the backs of successive said books into aligned relation with said orifice to receive adhesive therefrom, means forming a reservoir for maintaining a quantity of said adhesive in fluid condition, a pump, a pump block secured to said pump and to said reservoir, means forming a passage in said pump block connecting said reservoir with the suction side of said pump, means forming an outlet in said block from the discharge side of said pump adapted for connection to said work station for conveying said adhesive from said reservoir to said orifice under pressure for pressure discharge through said orifice, means forming another passage in said block connecting said outlet with the suction side of said pump, and a check valve normally closing said other passage and adapted to open for recirculating said adhesive to said reservoir upon interruption of said connection to said work station.

21. Apparatus for applying a fluid adhesive to the backs of successive books in a book binding machine including means for conveying successive said books through a work station, comprising means forming a reservoir for maintaining a quantity of said adhesive in fluid condition, means at said work station forming a discharge orifice for said adhesive, means cooperating with said conveying means to guide the backs of successive said books into aligned relation with said orifice to receive adhesive therefrom, means including a first pump for conveying said fluid adhesive from said reservoir to said orifice under pressure for pressure discharge through said orifice, a valve at said work station controlling the flow of said adhesive to said orifice, means forming a return connection from said work station to said reservoir for return flow of said adhesive to said reservoir for recirculation when said valve is closed, means at said work station for metering excess adhesive from said books, means including a second pump connected with said metering means and said reservoir for recirculating said excess adhesive to said reservoir, and means connecting said return connection with the suction side of said second pump for supplying to said second pump a portion of said return flow of adhesive when said valve is closed.

ROBERT E. FOGG.

References Cited in the file of this patent

UNITED STATES PATENTS

| Number | Name | Date |
|---|---|---|
| 1,724,179 | Bullerjahn | Aug. 13, 1929 |
| 1,830,114 | Kinney | Nov. 3, 1931 |
| 1,895,617 | Fay | Jan. 31, 1933 |
| 2,474,691 | Roehm | June 28, 1949 |
| 2,505,063 | Palermo | Apr. 25, 1950 |